US009475155B2

(12) United States Patent
Gatlin et al.

(10) Patent No.: US 9,475,155 B2
(45) Date of Patent: Oct. 25, 2016

(54) RING GEAR BASED WELDING SYSTEM

(71) Applicant: Global Industries Offshore, L.L.C., Houston, TX (US)

(72) Inventors: Robert Wayne Gatlin, Orange, TX (US); Charles Stewart, Orange, TX (US); Ian Sykes, Houston, TX (US)

(73) Assignee: Technip USA, Inc., Carlyss, LA (US)

( * ) Notice: Subject to any disclaimer, the term of this patent is extended or adjusted under 35 U.S.C. 154(b) by 188 days.

(21) Appl. No.: 13/953,258

(22) Filed: Jul. 29, 2013

(65) Prior Publication Data

US 2014/0034714 A1    Feb. 6, 2014

Related U.S. Application Data

(63) Continuation-in-part of application No. 12/698,815, filed on Feb. 2, 2010, now Pat. No. 8,916,791.

(60) Provisional application No. 61/679,393, filed on Aug. 3, 2012.

(51) Int. Cl.
*B23K 37/053* (2006.01)
*B23K 9/028* (2006.01)
(Continued)

(52) U.S. Cl.
CPC ........... *B23K 37/053* (2013.01); *B23K 9/0286* (2013.01); *B23K 9/121* (2013.01); *B23K 37/0276* (2013.01)

(58) Field of Classification Search
CPC ...... B23K 9/0286; B23K 9/121; B23K 9/12; B23K 9/028; B23K 9/0253; B23K 9/0282; B23K 5/02; B23K 11/062; B23K 11/0873; B23K 11/0953
USPC ............ 219/60 A, 59.1, 60 R, 61, 61.3, 61.4
See application file for complete search history.

(56) References Cited

U.S. PATENT DOCUMENTS 3,102,187 A    8/1963  Coscia
3,972,432 A    8/1976  Mori et al.
(Continued)

FOREIGN PATENT DOCUMENTS

WO    2007110514 A1    10/2007
WO    2011097131 A1    8/2011

OTHER PUBLICATIONS

PCT Application No. US2011/022968; International Search Report and Written Opinion of the International Searching Authority for Applicant Global Industries Offshore, LLC dated Apr. 6, 2011.

*Primary Examiner* — Brian Jennison
(74) *Attorney, Agent, or Firm* — Jones Walker LLP

(57) ABSTRACT

A method of welding a pipe section in a ring-based welding system, wherein the welding system comprises: (i) an adjustable ring gear mount; (ii) a ring gear assembly positioned on the adjustable ring gear mount, the ring gear assembly having an inner diameter and a center point; and (iii) at least one weld head assembly mounted on the ring gear assembly. The method includes steps of: (a) positioning the pipe section within the ring gear assembly, the pipe section having an object attached the pipe section which enlarges a cross-sectional profile of the pipe section; (b) moving the pipe section through the ring gear assembly in a direction substantially parallel to the pipe section's longitudinal axis; (c) operating the adjustable ring gear mount to move the center point of the ring gear assembly relative to the pipe center point in a plane substantially orthogonal to the pipe section's longitudinal axis; and (d) moving the attached object through the ring gear assembly while the ring gear assembly remains an enclosed circular structure.

23 Claims, 15 Drawing Sheets

(51) Int. Cl.
  *B23K 9/12* (2006.01)
  *B23K 37/02* (2006.01)

(56) References Cited

U.S. PATENT DOCUMENTS

| | | | |
|---|---|---|---|
| 4,145,593 A | 3/1979 | Merrick et al. | |
| 4,177,913 A | 12/1979 | Iwamoto et al. | |
| 4,328,416 A | 5/1982 | Dudley et al. | |
| 4,373,125 A | 2/1983 | Kazlauskas | |
| 5,126,523 A * | 6/1992 | Rinaldi | B23K 37/0533 219/125.11 |
| 5,146,064 A | 9/1992 | Poirier | |
| 5,347,101 A | 9/1994 | Brennan et al. | |
| 5,685,996 A * | 11/1997 | Ricci | 219/121.39 |
| 5,796,068 A | 8/1998 | Jones | |
| 5,910,258 A | 6/1999 | Kazirskis et al. | |
| 6,430,472 B1 | 8/2002 | Boillot et al. | |
| 6,737,601 B1 * | 5/2004 | Kramer et al. | 219/61 |
| 2002/0046999 A1 | 4/2002 | Veikkolainen et al. | |
| 2006/0021220 A1 | 2/2006 | Sato et al. | |
| 2007/0040911 A1 | 2/2007 | Riley | |
| 2011/0049105 A1 * | 3/2011 | Dupont | B23K 9/0286 219/59.1 |

\* cited by examiner

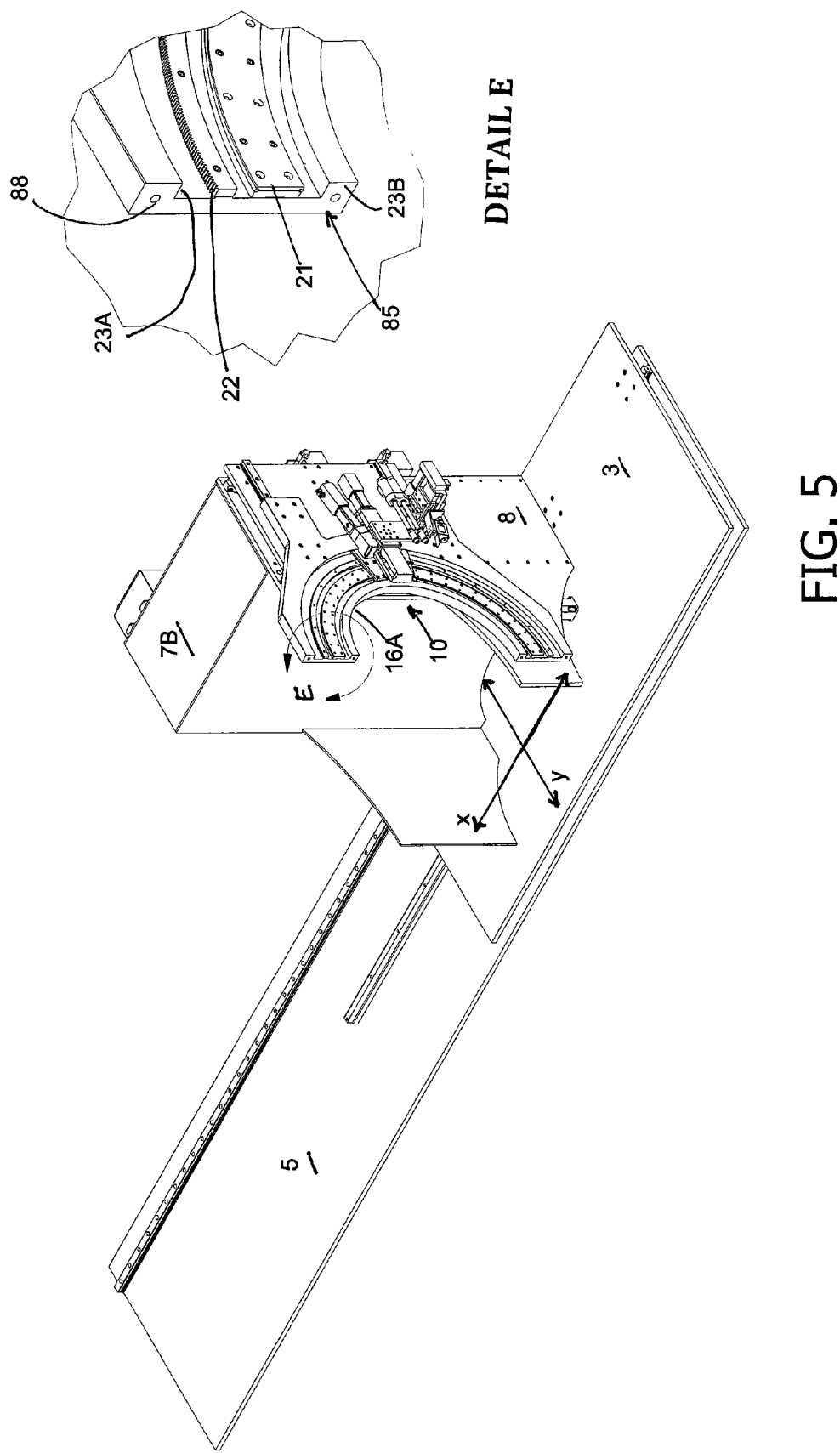

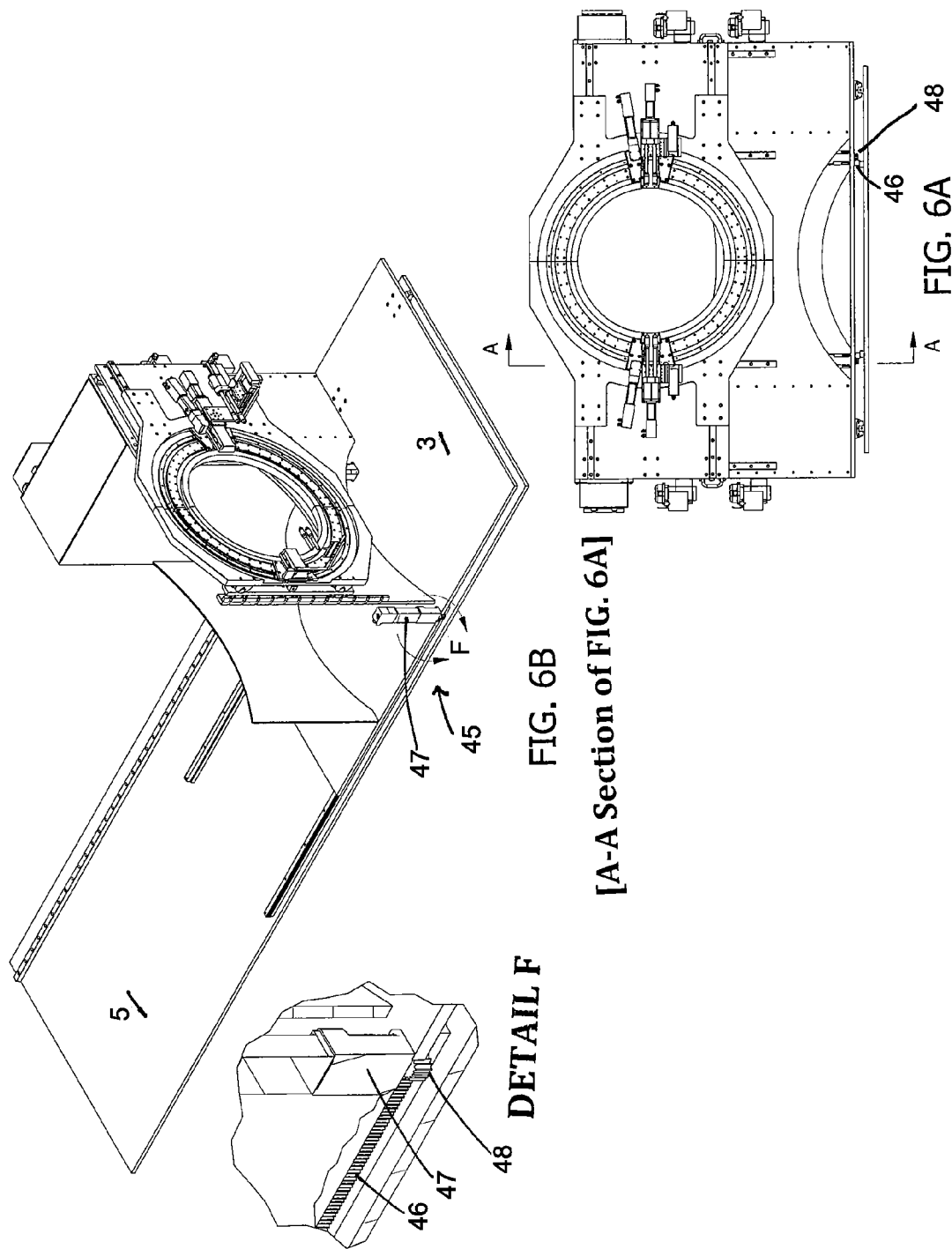

RING GEAR BASED WELDING SYSTEM

This application claims the benefit of U.S. Provisional Application Ser. No. 61/679,393, filed on Aug. 3, 2012, and is a continuation-in-part of U.S. Ser. No. 12/698,815, filed on Feb. 2, 2010, both of which are incorporated by reference in their entirety.

I. FIELD OF INVENTION

The present invention relates, in general, to the welding of pipe joints and, in particular, to automated methods for welding pipe joints.

II. BACKGROUND OF INVENTION

When laying a pipeline at sea it is customary to weld, on a lay-barge, individual pipe sections into a pipe string (with the pipe string leading towards the seabed). The pipe-string is under great tension while being laid and weld joints must be sufficiently strong to withstand the high forces imposed on the weld joints. Each time a pipe is welded to another pipe, extensive tests are made to ensure that the quality of the weld joint formed is sufficient. The strength of a weld joint depends upon various factors, one being the geometry of the path traced by the point of contact of the arc in relation to the surfaces of the pipes to be joined. If the point of contact of the arc is not closely controlled, the quality of the weld may be insufficient.

One conventional method of welding two pipes together involves beveling the ends of the pipes such that when the pipes are arranged coaxially with respect to each other immediately before the welding process commences, an exterior circumferential groove is defined between the two pipes. A carriage is mounted on one of the pipes for movement around the circumference of the pipes to be joined, e.g., a conventional "bug & band" system. A welding torch is mounted on the carriage and the apparatus is so arranged that the end of the metal electrode of the torch is opposite and relatively close to the circumferential groove. The carriage is moved around the circumference of the pipe and the torch is operated so that an arc is directed into the groove. The arc is guided manually and/or by various mechanical sensors to guide the arc as accurately as possible along the length of the groove. The welding process generally takes several passes and often the passes are performed by a series of sequentially positioned welding stations on a lay-barge.

In pipe laying, the welding process is highly repetitive requiring the welding of hundreds of pipe joints per day with multiple passes on each pipe joint. Therefore, even small increases in the speed of the individual welding cycle for each pipe joint can result in significant operational savings.

III. BRIEF DESCRIPTION OF THE DRAWINGS

FIG. 5 illustrates a sectional view of the ring gear assembly.

FIG. 6A is a front view of one embodiment of the carriage positioning mechanism.

FIG. 6B is an isometric sectional view of the carriage positioning mechanism of FIG. 6A.

IV. DETAIL DESCRIPTION OF SELECTED EMBODIMENTS

Figure 1:
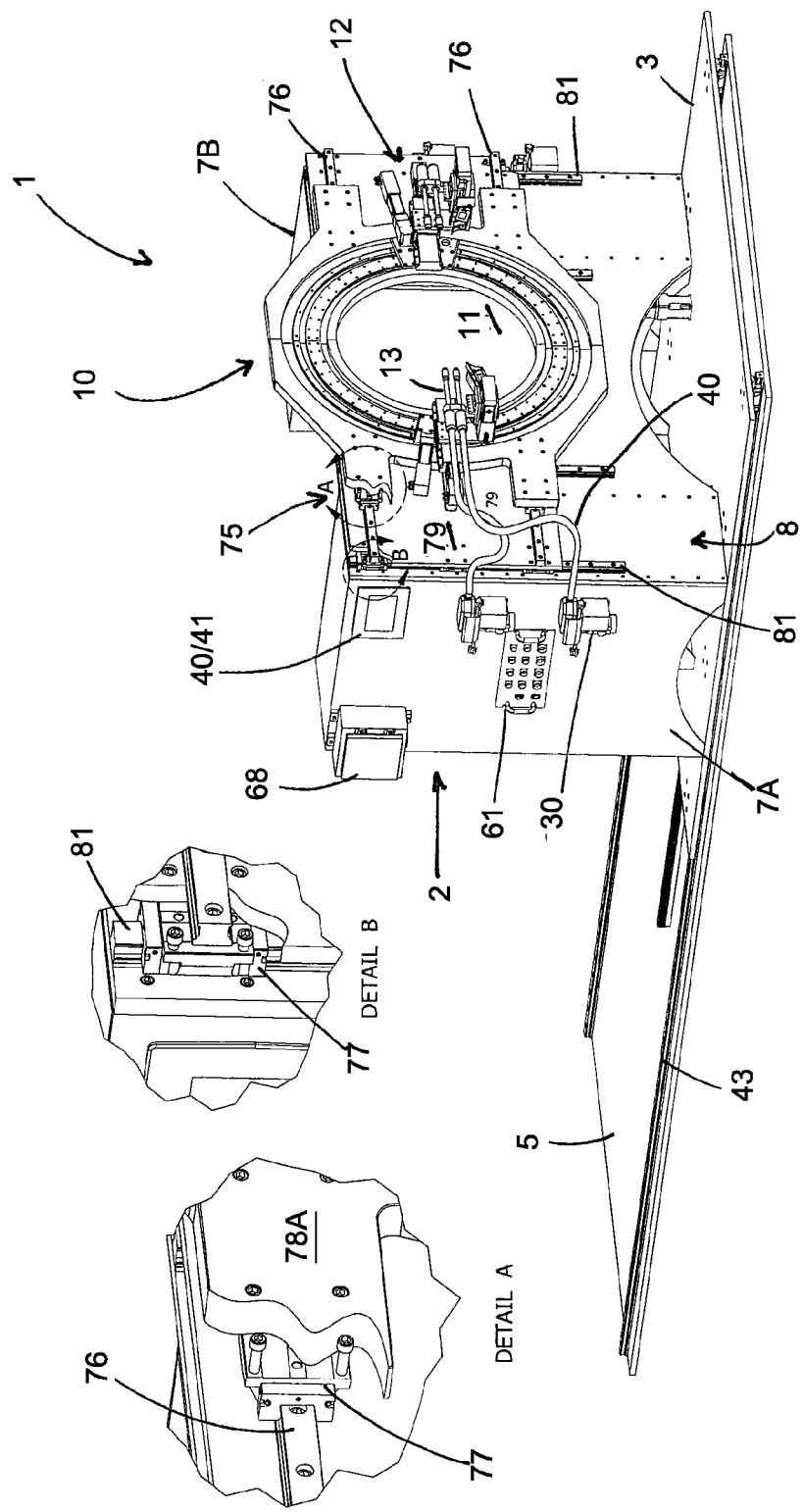
FIG. 1 is an isometric view of one embodiment of the automated welding system of the present invention.
Figure 2:
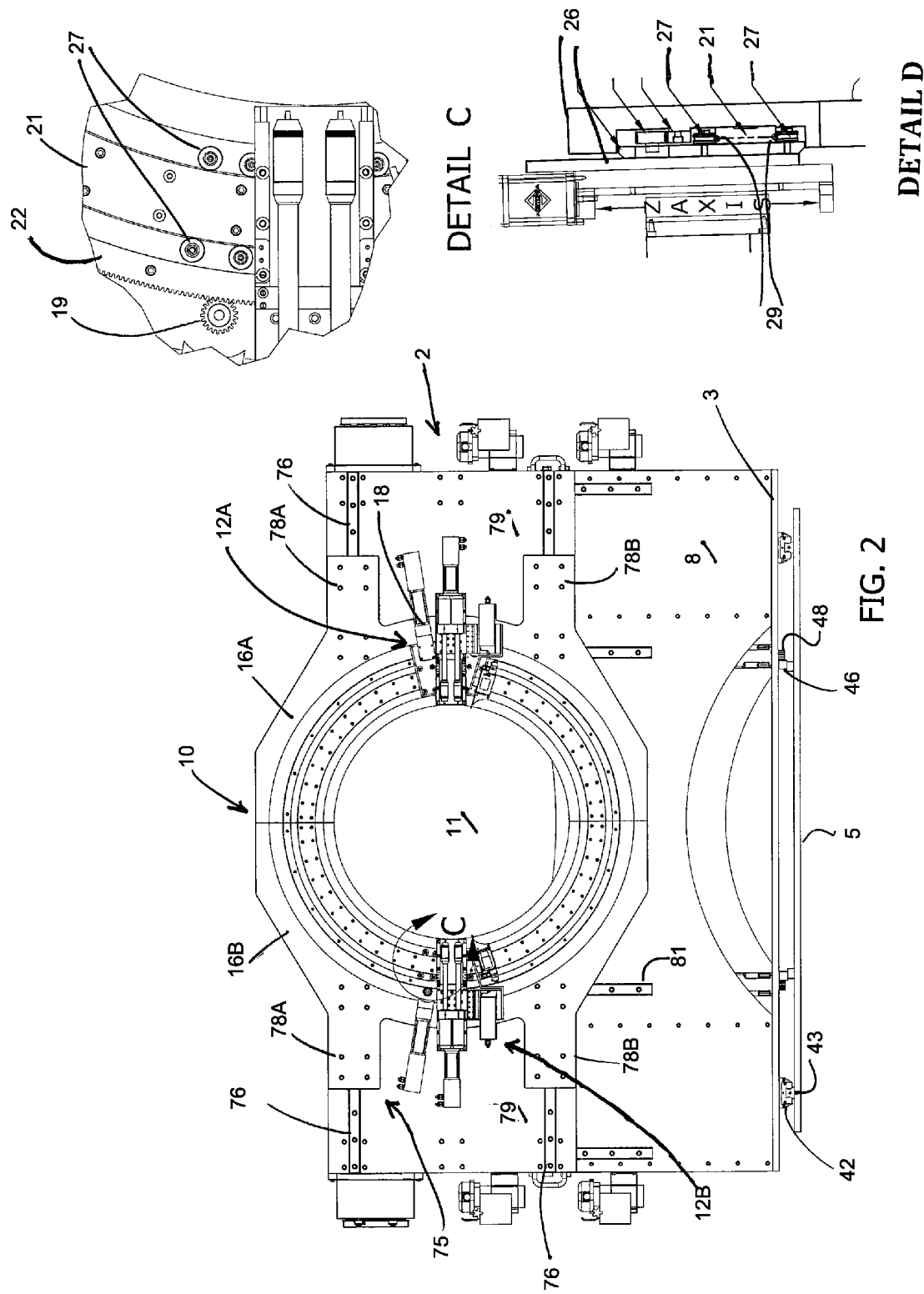
FIG. 2 is a front view of the welding system seen in FIG. 1.

FIG. 1 illustrates one embodiment of automated welding system 1. This embodiment generally comprises a traveling base carriage 2, a ring gear assembly 10, and one or more weld head assemblies 12 mounted on ring gear assembly 10. In FIG. 1, the principle components of traveling base carriage 2 consist generally of two side compartments 7A and 7B and front plate 8 fixed onto traveling platform 3. Typically, a floor plate 5 is positioned on a surface of a welding area or welding station. In one embodiment, this surface is the deck of a pipe laying barge or other maritime vessel. However, floor plate 5 could also be positioned at any land-based location. When floor plate 5 is positioned on a pipe laying barge, floor plate 5 will normally be located at a designated "weld station" or location on the barge where the pipe is intended to be welded. Often there will be multiple weld stations on a barge and a welding system 1 could be positioned at each weld station. As seen in FIGS. 1 and 2, traveling platform 3 is able to move along floor plate 5 via rail carriage 42 riding on guide rails 43. As suggested by the end view of FIG. 2, the cross-section of this example of guide rail 43 takes on a conventional dove-tail shape to ensure secure engagement with rail carriage 42.

Many embodiments of the welding system will include a carriage positioning mechanism, one example of which is seen in FIG. 6B. Carriage positioning mechanism 45 imparts lateral movement (i.e., movement back and forth along directional arrow 52 in FIG. 6B) between the fixed floor plate 5 and traveling platform 3. Such lateral movement occurs in a direction substantially parallel to the pipe section's longitudinal axis (e.g., see, axis "A" in FIG. 9). In the embodiment shown in Detail F of FIG. 6B, the carriage positioning mechanism 45 consists of splined track 46 being engaged by gear 48, which is in turn powered by motor 47. Although FIG. 6B shows only one motor 47, it will be understood a second one is hidden from view and corresponds with the second gear 48 seen in the Figures. Viewing FIG. 2, it will be apparent how traveling platform 3 is able to ride on the two guide rails 43 with the engagement of gear 48 and splined track 46 providing the motive force necessary for controllably positioning traveling base carriage 2, and thus ring gear assembly 10, at any lateral position along floor plate 5.

Figure 3:
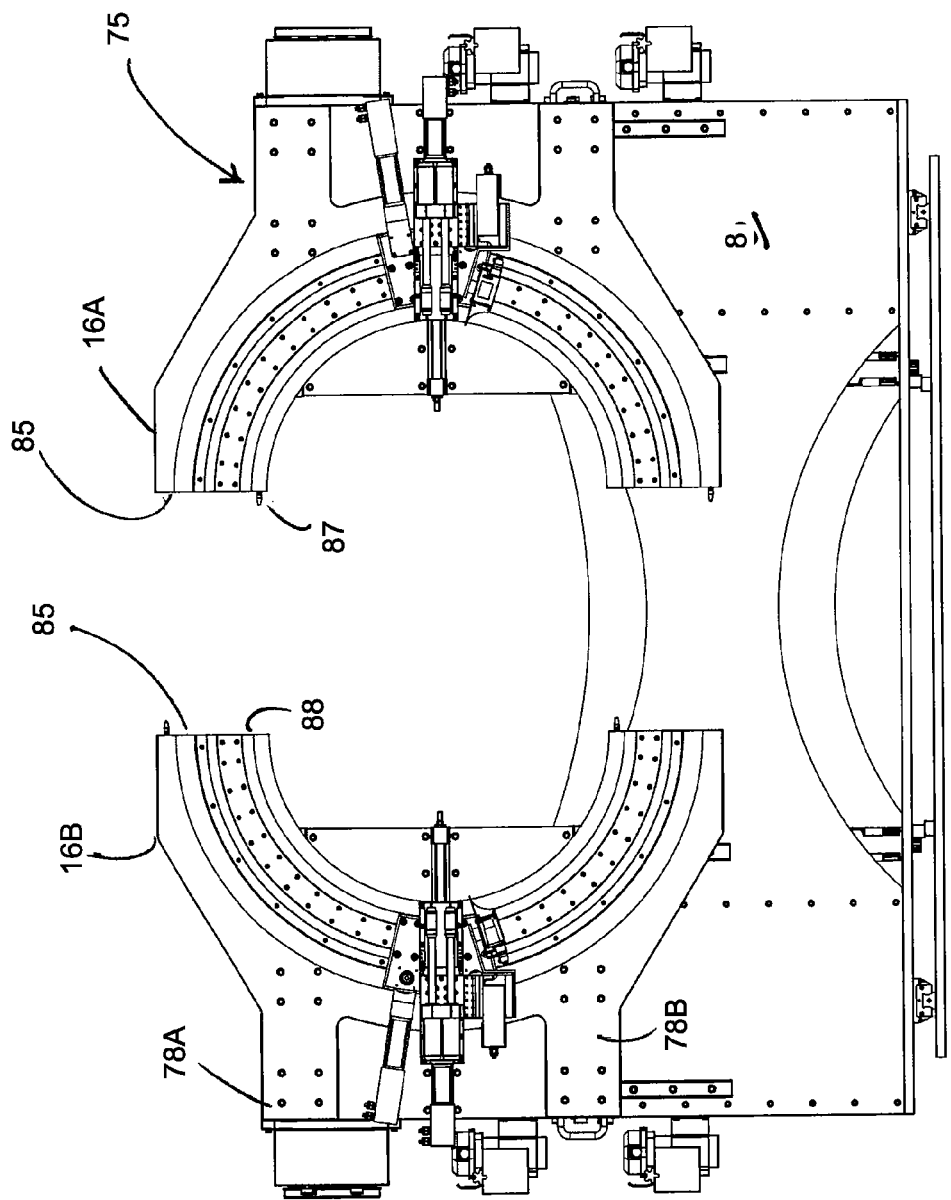
FIG. 3 illustrates a ring gear assembly in the separated position.

As seen in FIGS. 2 and 3, this embodiment of ring gear assembly 10 is formed by two half ring sections 16A and 16B and ring gear mounting assemblies 75 for connecting the half ring sections 16 to front plate 8 of base carriage 3.

As part of this embodiment of mounting assemblies 75, each of half ring sections 16A and 16B include upper extension arm 78A and lower extension arm 78B. The extension arms 78A and 78B will engage horizontal guide rails 76 which are in turn fixed to mounting plates 79. As suggested in detail A of FIG. 1, a rail carriage 77 is bolted onto each extension arm 78 such that rail carriages 77 may slidingly engaging guide rails 76, thereby allowing half ring sections 16A and 16B to move between the open and closed positions seen in FIGS. 3 and 2, respectively. In this embodiment, guide rails 76 and rail carriages 77 will have a mating dove tail configuration similar to guide rails 43 and rail carriages 42 described above. This embodiment of ring gear mounting assemblies 75 further provides a means for adjusting the vertical height of ring gear assembly 10 through the sliding connection of mounting plates 79 to front plate 8 via vertical guide rails 81. As suggested in detail B of FIG. 1, vertical guide rails 81 (which are oriented substantially perpendicular to guide rails 76) will be engaged by the rail carriages 77 bolted to mounting plates 79. In many embodiments, a pin, catch, or other locking mechanism will engage the guide rails and rail carriages to prevent relative movement between these elements once they are in the desired position, e.g., ring gear assembly 10 is set at the desired height on vertical guide rails 81.

FIGS. 2 and 3 illustrate how half ring sections 16A and 16B will move between an open and closed position. While the embodiment of FIG. 2 shows the "closed position" with half ring sections 16A and 16B in actual contact, this may not be necessary for all embodiments of the invention. For example, a "closed position" with a some gap between the half ring sections is possible if the travel of weld head assemblies 12 is limited to their respective half ring sections. However, in more typical embodiments, the closed position will bring the half ring sections into mating engagement. The illustrated half ring sections 16 generally include mating surfaces 85 where the two half ring sections engage one another. In FIG. 3, the mating surface will include guide members formed of pin extensions 87 which engage apertures 88 (see Detail E of FIG. 5). However, those skilled in the art will recognize many other techniques for guiding the half ring sections 12 into a well aligned engagement. "Mating engagement" is not limited to any particular structure and mating engagement simply means the two half ring sections come together within sufficient tolerance to allow the weld head assemblies to transverse the connection point of the two half ring sections. Although not specifically illustrated, many embodiments will include a releasable fastener, such as a latch, lock, or other mechanism, that maintains half ring sections 16A and 16B together when in the closed position and is releasable to allow the half ring sections to move into the open position.

Although the embodiment seen in the figures contemplates manual positioning of the half ring sections 16A and 16B, on guide rails 76, other embodiments could automate this positioning function using worm gears, piston and cylinder assemblies, or other conventional or future developed positioning mechanisms. Likewise, guide rails 76 and rail carriages 77 are merely one form of mounting assembly 75 and those skilled in the art will recognize many obvious variations which are intended to come within the scope of the present invention.

Figure 4A:
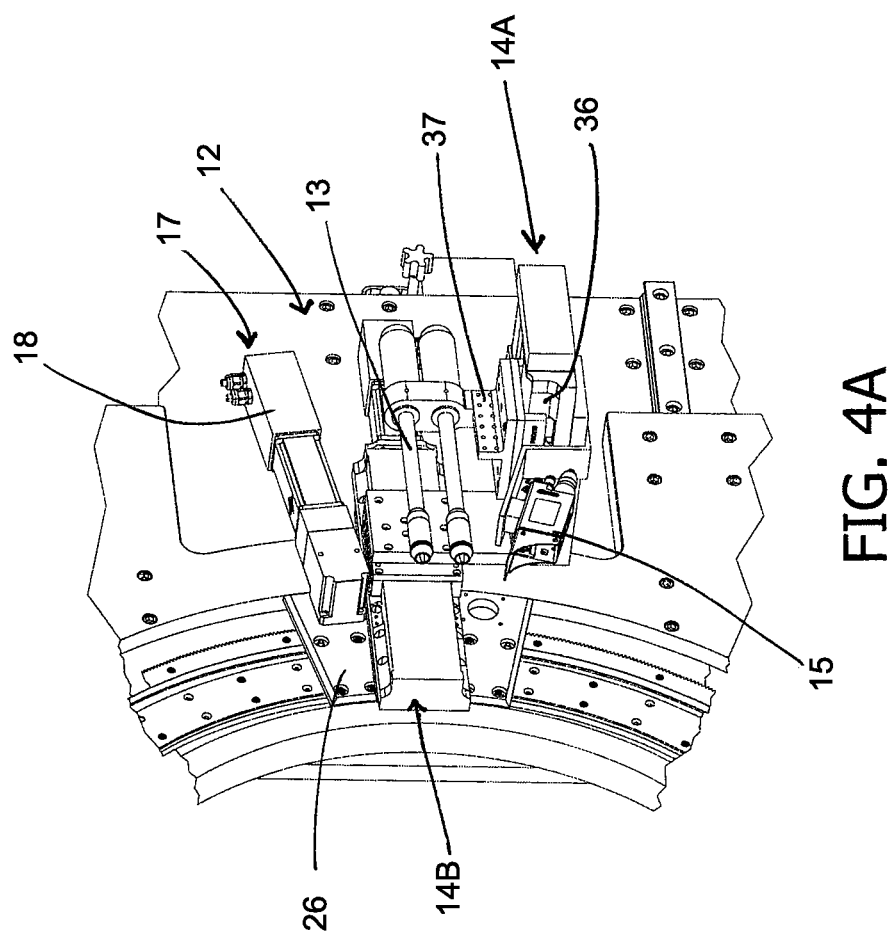
FIGS. 4A and 4B are enlarged views of one embodiment of the weld head assembly.
Figure 4B:
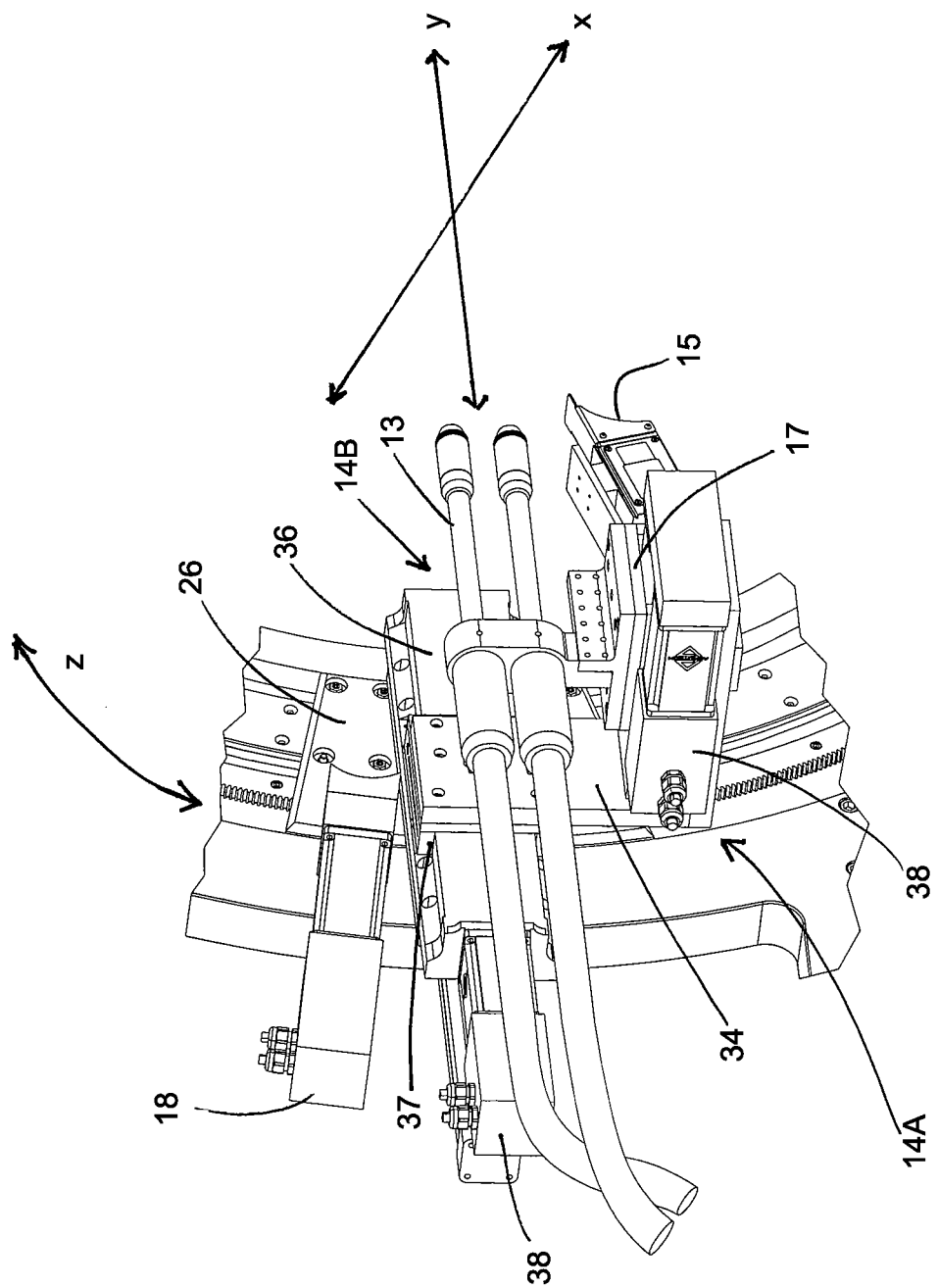

The general function of ring gear assembly 10 is to provide an orbital path for one or more weld head assemblies 12. The particular structure which the illustrated embodiments of ring gear assembly 10 employ to carry out this function is best seen in Detail E of FIG. 5. The open face of ring gear assembly 10 will include ring gear 22, guide track 21, and outer/inner shoulders 23A and 23B of ring gear assembly 10, all of which are circular structures set at different radial distances from the center of ring gear assembly 10. FIGS. 4A and 4B illustrate how the weld head assemblies 12 will include the arcuate mounting plate 26 with a width and radius of curvature which allows mounting plate 26 to slide in an orbital path around ring gear assembly 10 between shoulders 23A and 23B. Although somewhat hidden from view in the figures, it will be understood that the reverse side of mounting plate 26 has a series of rollers engaging guide track 21. Detail C of FIG. 2 shows mounting plate 26 removed but illustrates how rollers 27 would engage guide track 21. Detail D of FIG. 2 shows a side sectional view of rollers 27 engaging guide track 21. Detail D also suggests how the bead track 29 formed on each side of guide track 21 and which is engaged by a center groove formed in rollers 27 will help maintain mounting plate 26 securely coupled to guide track 21.

It will also be apparent from the figures that mounting plate 26 forms the attachment point for the other components of weld head assembly 12 to ring gear assembly 10. A weld head assembly positioner 17, which in the illustrated embodiment is positioning motor 18, will engage mounting plate 26. Positioning motor 18 will have a shaft which extends through mounting plate 26 and drives a gear 19 (see detail C in FIG. 2) which engages ring gear 22. The splines of gear 19 will engage the cogs on ring gear 22 such that torque applied by positioning motor 18 to gear 19 will cause mounting plate 26 (and thus weld head assembly 12) to move in an orbital path along guide track 21. In one embodiment, positioning motor 18 is a model no. BM200 available from Aerotech, Inc. of Pittsburgh, Pa.

Although detail E in FIG. 5 illustrates one embodiment of ring gear assembly 10's gear and guide track structure, those skilled in the art will see that many modifications are possible. For example, rather than being on the outer perimeter of guide track 21, ring gear 22 could alternatively be on the inner perimeter of guide track 21. Alternatively, there could be two rings 22, e.g., a ring gear on each side of guide track 21. As a still further alternative, a single ring gear 22 could be provided with two guide tracks 21 (e.g., a guide track on both the inner and outer perimeter of the ring gear). These and other modifications to ring gear assembly 10 should be considered within the scope of the present invention.

Returning to FIG. 4A, other components of weld head assembly 12 directly or indirectly positioned on mounting plate 26 include a welding torch 13, two torch positioners 14A and 14B, and a torch position sensor 15. Although the particular welding torch 13 illustrated in FIG. 4A is a dual torch configuration, the use of "welding torch" in the singular will refer to any of: a single torch, dual torch, or other torch configuration.

The torch positioners 14A and 14B (as best seen in FIG. 4B) include a mounting rail 36 (also sometimes referred to as a "linear stage") and a sliding bracket 37 which moves along mounting rail 36. In one embodiment, torch positioners 14A and 14B are PRO-115 series linear actuators manufactured by Aerotech, Inc. of Pittsburgh, Pa. In the illustrated embodiment, mounting rail 36 of torch positioner 14B is bolted to mounting plate 26. Although hidden from view in the figures, a worm gear within mounting rail 36 engages sliding bracket 37 and is rotated by motor 38, causing sliding bracket 37 to moved along the length of mounting rail 36. It can be seen in FIG. 4B that a side mounting bracket 34 is attached to sliding bracket 37. Attached to side mounting bracket 34 is the torch positioner 14A. Viewing FIG. 4A, torch positioner 14A also has a mounting rail 36 and a sliding bracket 37 to which torch 13 is attached. However, it can be seen that the mounting rail 36 for torch position 14A is somewhat shorter than that for torch position 14B because torch positioner 14A can function with a lesser range of movement.

With torch 13 attached to sliding bracket 37 of positioner 14A, the torch can move in the "x" direction (i.e., parallel to a pipe section being welded) defined by the co-ordinate reference seen in FIGS. 4B and 5. Likewise, positioner 14A itself is attached to the sliding bracket 37 of the positioner 14B, thereby allowing positioner 14A (and thus torch 13) to move back and forth in the "y" direction shown in FIGS. 4B and 5 (i.e., moving torch 13 radially toward and away from the pipe section). Because torch positioner 14B is fixed to mounting plate 26, it can be seen that the orbital path of mounting plate 26 (the "z" direction shown in FIG. 4B) will move torch 13 around the circumference of a pipe positioned through center opening 11 of ring gear assembly 10.

As also shown in FIG. 4A, a position sensor 15 is positioned adjacent to torch 13 on torch positioner 14A. In this embodiment, position sensor 15 is mounted directly on torch positioner 14A and therefore moves with the torch 13. However, in other embodiments, position sensor 15 could be mounted independently of either torch positioner (e.g., on any open area of mounting plate 26) and not move in either the "y" or "x" directions. In the embodiment shown, position sensor 15 is a combination laser/CCD device which can identify surface features on the pipe (e.g., the joint between two pipes which are being welded). Such laser/CCD devices are described in U.S. Pat. No. 6,430,472 which is incorporated by reference herein in its entirety. A commercial embodiment of such a sensor is the AUTO-TRAC® laser vision system provided by Servo-Robot, Inc. of St-Bruno, Canada. Position sensor 15 provides data on the position of torch 13 relative to the pipe joint being welded and allows a controller (described below) to move the torch 13, via positioners 14A and 14B, in the necessary pattern to properly weld the pipe joint. The embodiment showing in FIG. 1 mounts the AUTO-TRAC® control components 68 on side compartment 7. In alternative embodiments, the position sensor could be any suitable conventional or future developed position sensing technique, including thru-the-arc sensing which detects a change in arc voltage based on torch distance from the pipe joint, or mechanical sensing which uses a physical wand or probe in contact with the pipe joint.

Different types of torches 13 may be used with the present positioning system. Example welding technologies include gas metal arc welding (GMAW), gas tungsten arc welding (GTAW), flux cord arc welding (FCAW), or laser beam welding (LBW), but other conventional and future developed welding methods should be considered within the scope of the present invention. The number of weld head assemblies positioned on ring gear assembly 10 may vary based upon factors such as the welding technology employed and the size of the pipe being welded. For GMAW, one embodiment employs two weld head assemblies 12, while other embodiment could employ just one weld head assembly 12 or possibly 3, 4, or more weld head assemblies 12. When using LBW or plasma arc welding systems, preferred embodiments may employ a single weld head assembly (but could also employ multiple weld head assemblies).

FIG. 1 illustrates weld-head flexible supply conduits (or hoses) 40 extending between the torches 13 and wire feed assemblies 30 which are positioned on the walls of side compartments 7. Where the torch is the type using a consumable wire in the welding process (e.g., gas metal arc welding), wire is fed through hoses 40 to torches 13 by feed assemblies 30 as is known in the art. A supply of wire is typically stored on a spool or reel (not shown) and is usually drawn off the reel by a feed motor in order to feed torches 13 in a controlled manner. Hose 40 may also enclose power cables for the torch and positioner motors along with electrical control lines to the positioner motors and position sensors on weld head assemblies 12. Although not shown, the control lines will run to a controller, which in certain embodiments is a computer system positioned within side compartment 7. In this embodiment, hoses 40 are flexible and of sufficient length to accommodate a weld head assembly 12's intended orbital path around ring gear assembly 10. For example, if two weld head assemblies 12 are employed, the hoses 40 may only need to be long enough to accommodate a half-orbit path, whereas if one weld head assembly 12 is employed, the hoses may need to be long enough to accommodate a full orbit of travel by the weld head assembly.

Figure 7:
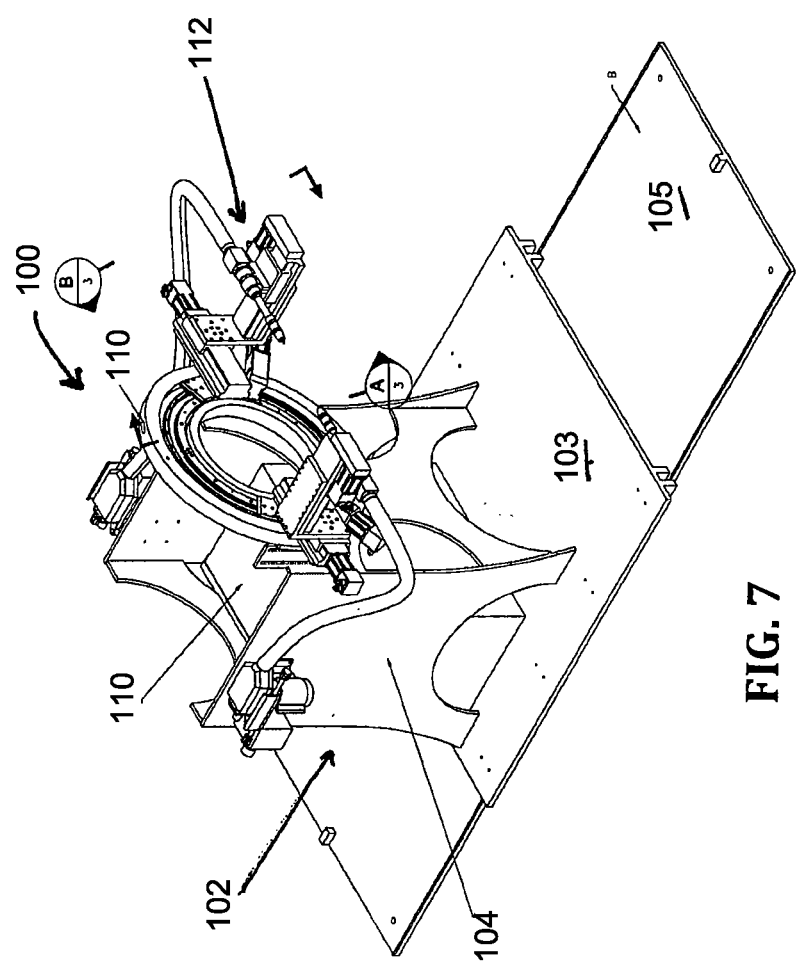
FIG. 7 is an isometric view of an alternative embodiment of the present invention.
Figure 8:
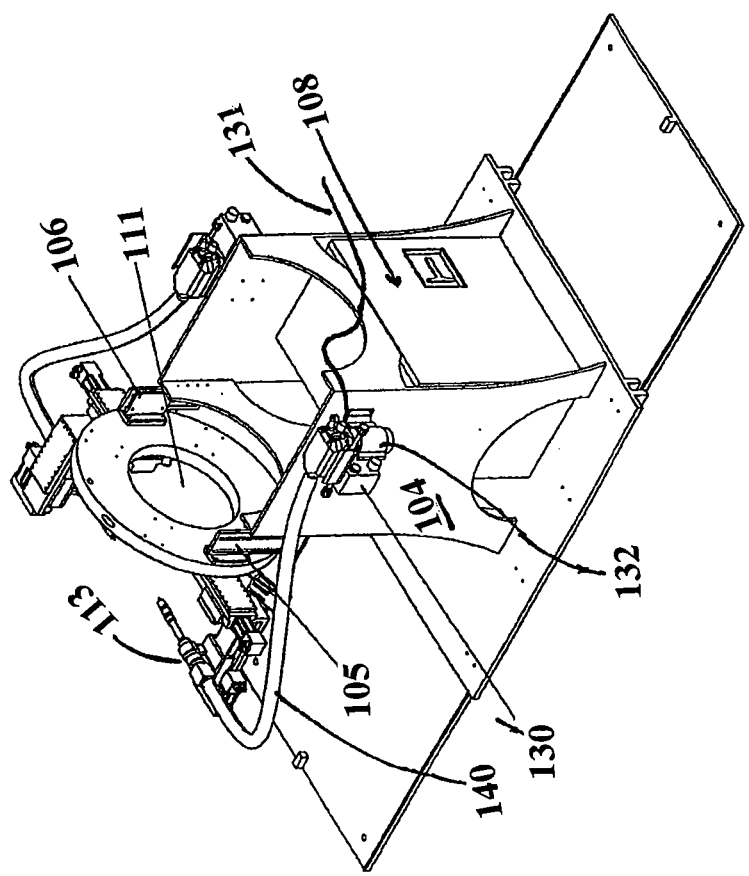
FIG. 8 is a rear view of the embodiment of FIG. 7.

FIGS. 7 and 8 illustrate an alternate embodiment of the inventive welding system. In this embodiment, welding system 100 includes a unitary ring gear assembly 110, i.e., a ring gear assembly which is a continuous ring of material (or at least multiple segments fixed together in a semi-permanent manner) as opposed to the readily separable segments as in the previous embodiment. Viewing FIG. 8, a pair of vertically adjustable ring gear assembly brackets 106 will mount ring gear assembly 110 on ring gear assembly stand 104. Ring gear assembly brackets 106 will allow the height of ring gear assembly 110's center aperture 111 to be adjusted to approximately match the height of the pipe sections being welded, as is explained in more detail below. The weld head assemblies 112 are substantially the same as weld head assemblies 12 described above. However weld head assemblies 112 are of a single torch configuration. As suggested in FIG. 7, welding system 100 will have a travel base carriage 102 mounted on a traveling platform 103 which moves on floor plate 105 in a manner similar to that described above in reference to traveling base carriage 2.

Similar to the embodiment described in FIG. 1, FIG. 8 illustrates weld-head flexible supply conduits (or hoses) 140 extending between the torches 113 and wire feed assemblies 130 which are positioned on a sidewalls of ring gear assembly stand 104. As with the earlier embodiment, hoses 140 are flexible and of sufficient length to accommodate a weld head assembly 112's intended orbital path around ring gear assembly 110.

Figure 9:
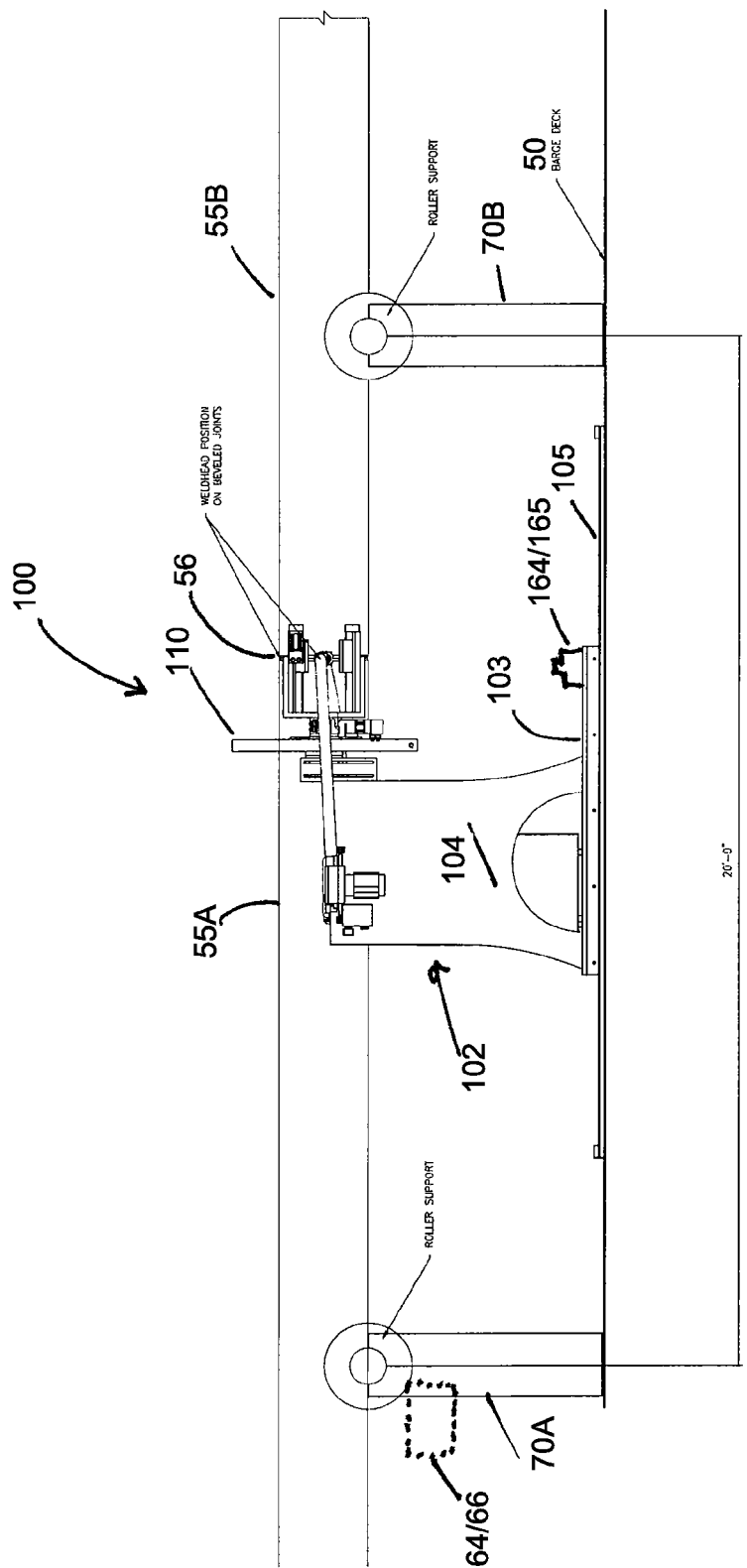
FIG. 9 illustrates the FIG. 7 embodiment welding the joint of two pipe sections.

As suggested in FIG. 9, certain embodiments of the welding system will include the floor plate 105 positioned on the deck 50 of a pipe-laying barge. Although this pipe-laying barge example is described in relation to welding system 100, it will be understood that the description is equally applicable to welding system 1. Typically the pipe-laying barge will have a series of support rollers 70 which support the individual pipe sections (before welding) and then the continuous pipeline portion (after welding). Although only two support rollers 70 are shown in FIG. 9, it will be understood that other support rollers to the right and left of those shown allow the pipe sections to lie level with the ends abutting at joint 56. In many situations, an internal clamp (not shown) will bridge the pipe joint within the two pipe sections and hold the ends of the pipe sections securely together. If the welding system is barge based, it can be envisioned that as individual pipe sections 55 (entering the welding area or weld station from the left) are welded together, a continuous pipe line of welded sections is formed and exits the weld station to the right. As shown, pipe sections 55 A and 55 B share a longitudinal axis. It will be understood that other equipment on the barge deck such as pipe tensioners (not seen in the figures) are typically holding the pipe sections in tension while letting the weight of the overboard pipeline and the barge's forward movement slowly move the pipe sections in a continuous process through one or more weld stations along the deck of the pipe laying barge. In this manner, the completed pipeline is continuously exiting the barge and being positioned on the sea-bed even as the length of the pipeline is being extended by the welding of new pipe sections to the pipeline. It will be apparent from the embodiment of FIG. 9 that the ring gear assembly 10 (and thus base carriage 2) is not connected to the pipe sections and may move independently of pipe sections. This may be distinguished from prior art "bug & band" systems where a band connects circumferentially around the pipe adjacent to the pipe joint and the weld head assembly is attached to and travels along the band. One significant disadvantage with conventional bug and band systems occurs when tensioner failure releases a pipe section allowing the pipe section to move through the weld stations at a high and uncontrolled speed. In this very dangerous situation, the bug & band structure along with the attached weld head assembly is carried with the pipe causing significant damage or injury to any equipment or personnel in the path of the bug and band structure. On the other hand, when employing the above described welding systems 1 or 100, a rapid and uncontrolled movement of the pipe sections does not drag extraneous equipment along with the pipe and is less likely to cause serious equipment damage or personnel injury.

Figure 10:
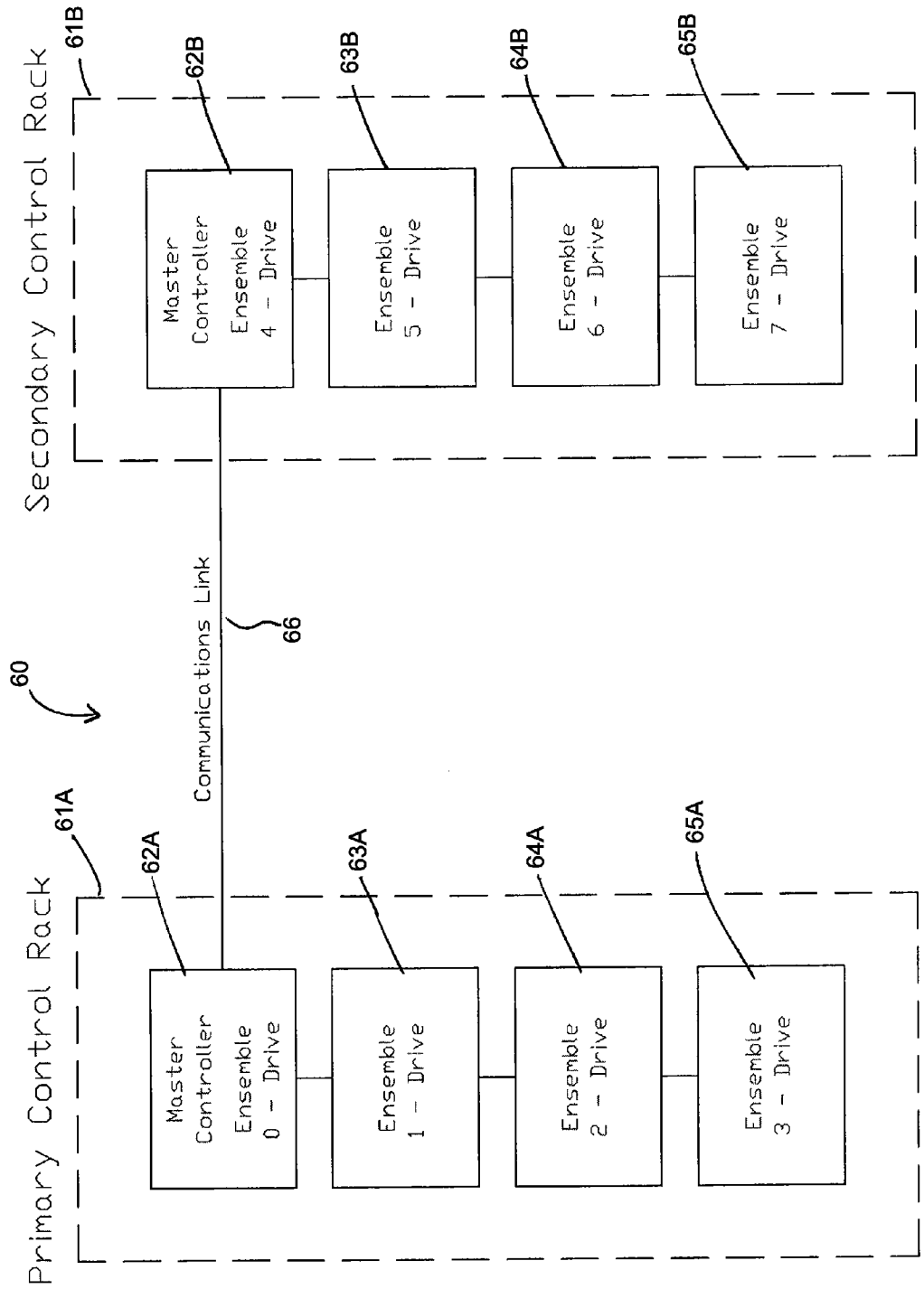
FIG. 10 is a component diagram of one control mechanism for the illustrated embodiments.

The illustrated embodiments of the welding systems 1 and 100 will include a system controller directing the operation of various components of the welding system. FIG. 10 shows schematically one embodiment of system controller 60. In this example, system controller 60 is divided into two control racks, primary control rack 61A and secondary control rack 61B, which control (among other functions) the weld head assemblies 12A and 12B, respectively. Each of the control racks 61 will further comprise a series of conventional PC based controllers 62-65, each of which will typically comprise a control card for driving one or more servo motors, input/output cards, and a microprocessor. One example of such a controller is the Ensemble CP provided by Aerotech, Inc. of Pittsburgh, Pa. In FIG. 10, controllers 62 (i.e., 62A and 62B) control the respective positioning motors 18 and the thus the orbital or "z" position (see FIG. 4B) of the weld head assemblies. Controllers 63 control the respective positioners 14A and thus the longitudinal or "y" direction movement the welding torches 13. Controllers 64 control the respective positioners 14B and thus the radial or "x" direction movement the welding torches 13. Controllers 65 control the carriage motors 47 (FIG. 6B) and thus the position of traveling base carriage 2. Each of the controllers 62 act as the master controller for their respective control racks. For certain limited functions such as determining the relative orbital positions of the two weld head assemblies, controller 62A acts as the master for controller 62B via communications link 66. As seen in the embodiment of FIG. 1, the control racks 61 may be mounted within side compartments 7.

However, system controller 60 is just one example of a suitable control system and in alternate embodiments, the system controller 60 could be devices such as programmable logic controllers or possibly even hard-wired circuitry. In addition to the components discussed above, a user interface 40 (FIG. 1) will allow users to input information and instructions to system controller 60. In the embodiment of FIG. 1, the user interface is a conventional human machine interface (HMI) 41 providing touch screen input features. One suitable HMI is a Silver Series 5121-X provided by Maple Systems, Inc. of Everett, Wash. Alternatively, user interface 40 could be another interface system such as a conventional keyboard, monitor, and mouse device.

Figure 11:
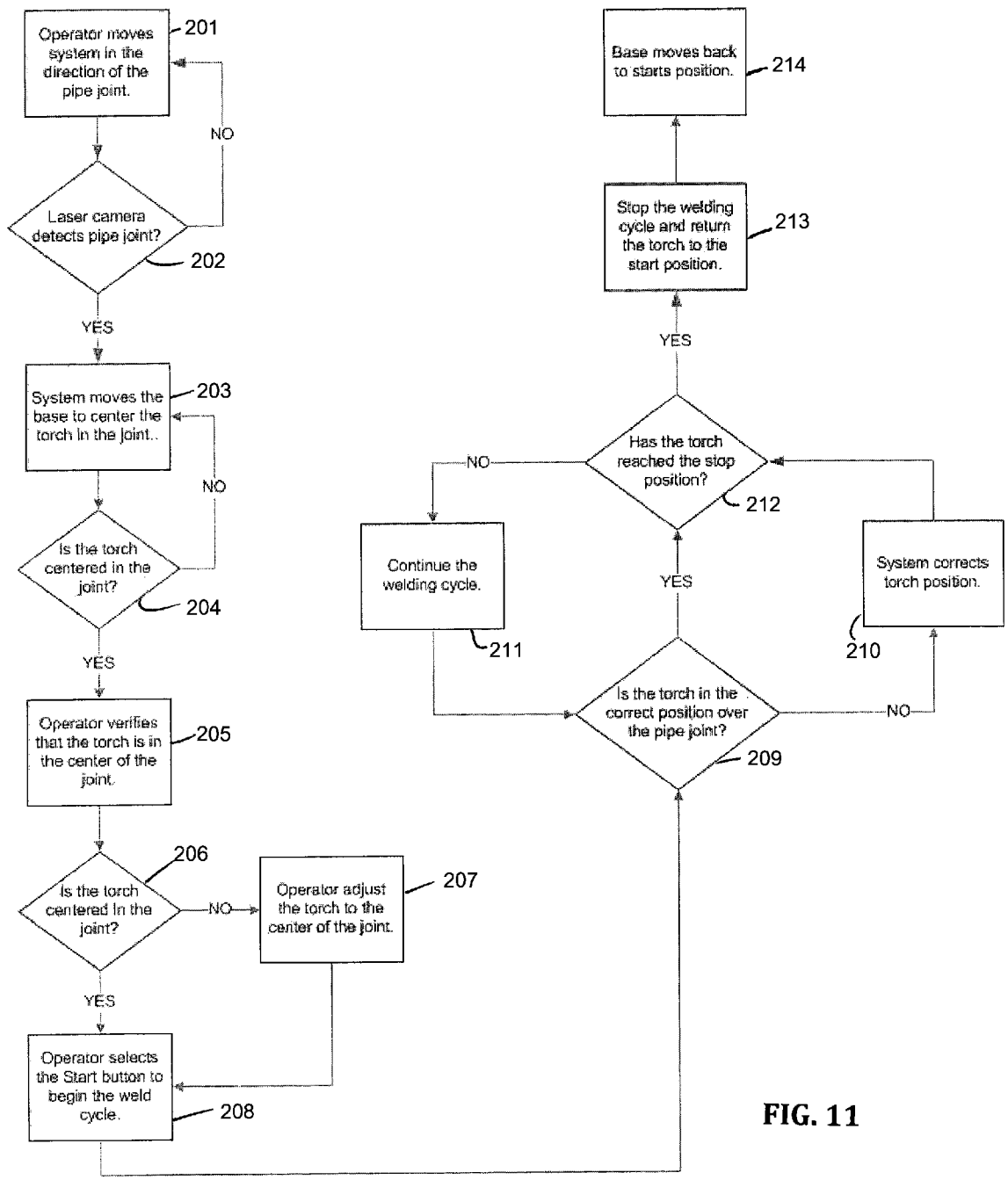
FIG. 11 is flow chart illustrating an example operational sequence of certain embodiments of the present invention.

Viewing FIG. 11 in conjunction with FIG. 9 illustrates one example of a welding cycle which could be implemented by system controller 60. In step 201, the operator initiates starting movement of the traveling base carriage 102 toward the direction of the approaching pipe joint 56. In step 202, the laser/camera components of position sensor 15 will determine when pipe joint 56 passes under the camera. In step 203, base carriage 102 changes velocity (speed and direction) as necessary to begin tracking pipe joint 56. The loop between steps 203 and 204 will allow base carriage 102 position itself such that the welding torches 13 on weld head assemblies 12 are centered over (or approximately centered over) pipe joint 56. Steps 205 to 207 allow the operator to visually confirm the centering of torches 13 over pipe joint 56 and make any necessary manual adjustments if an acceptable alignment is not visually confirmed. In step 208, the operator manually initiates the weld cycle. Steps 209 to 212 will perform a welding loop where the position of the welding torch 13 is continuously corrected (if required) as the torches proceed in their orbital path while welding the circumference of pipe joint 56. In the illustrated embodiment, the control software continuously adjusts the torch position based upon an x-y positioning feed back from the AUTO-TRAC® controller in order to maintain the welding torch at a predetermined height above the welding surface. In a preferred embodiment, the weld head assemblies 12 may also be controlled by a memory mapping mode which records the x-y coordinates from the preceding weld path and repeats this path based on the coordinates. Once the weld torch has reached its stop position (e.g., completion of its 180° circuit in a system having two weld head assemblies 12), the weld head assemblies will return to a pre-designated start position. In step 214, base carriage 102 will move back to a pre-designated start position. It will be understood that base carriage 102 is maintaining a velocity (both speed and direction) approximate to that of pipe joint 56 during the embodiment the welding steps of this process. Alternative control systems could use other feedback parameters to control the weld path. For example one alternative control system could make comparisons of welding feedback parameters (e.g., arc voltage and current, torch oscillation speed and width, and travel speed of arc) with a database of such parameters which has been empirically determined to provide optimal welds. In addition to the memory mapping mode described above, another alternative control system would be a manual controller an operator may use to adjust the x-y position of the welding torach.

Of course, FIG. 11 represent just one possible control sequence and any number of variations are within the scope of the invention. For example, the system could be completely automated with no inputs from a human operator. In one embodiment of such a completely automated system, the base carriage 102's pre-designated start position could be close to the boarder where the pipe joint 56 will enter the welding station. When the pipe joint 56 is detected passing under position sensor 15, the base carriage could begin tracking pipe joint 56 and initiate the other steps described above.

A still further alternative system could employ a separate joint sensor position within the weld station. FIG. 9 illustrates a joint sensor 164 positioned on the front of traveling platform 103. One example of joint sensor 164 would be a laser/camera distance finder 165. In another alterative, a roller sensor 66 such as an encoder which counts the turns of roller 70A and would use this information on roller turns to calculate details regarding the pipe velocity and distanced travel in a given time period.

In the embodiment where there is only one weld head assembly 12, the weld head assembly will make a full orbit around pipe joint 56 to weld the entire circumference of the joint. The most time efficient embodiment of the single weld head assembly system will make a full orbit weld in one continuous 360° trip of weld head assembly 12 (i.e., the weld head assembly does not back-track over a previous welded arc of the pipe joint). However, a full orbit weld may be accomplished by a single weld head assembly 12 welding the circumference of the pipe in broken segments. For example, the weld head assembly 12 could weld (clockwise) from the 12 o'clock position to the 6 o'clock position, cease welding and move back to the 12 o'clock position, and then begin welding again (counter-clockwise) toward the 6 o'clock position. Thus, a single weld head assembly 12 is considered to make a full orbit weld as long substantially the entire circumference of the joint is welded, regardless of how continuous or discontinuous the weld path is.

As suggested by the above description, there will be many embodiments providing two or more weld head assemblies 12 positioned on the ring gear assembly 10. In such embodiments, it may be advantageous to stagger the start times and positions of the various weld head assemblies so that they do not interfere with one another. Using the two weld head assemblies seen in FIG. 2 as an example, the first weld head assembly 12A may begin welding clock-wise from the 12 o'clock position while the weld head assembly 12B stands by at the 9 o'clock position. As weld head assembly 12A reaches the 3 o'clock position, weld head assembly 12B would move to the 12 o'clock position and begin welding in the counter-clockwise position. When weld head assembly 12A finishes its weld path at the 6 o'clock position, it will retreat to its starting position before weld head assembly 12B terminates it weld path at the 6 o'clock position. In certain embodiments, as the weld head assemblies 12 returns to their start or "home" positions, the sensor 15 on the weld head assemblies scan the weld. The scanning of the weld allows the computer system to determine the height of the weld bead in the groove of the pipe joint. The computer system can record the profile of the weld bead as detected by the camera and compare the actual weld bead profile to a database of joint geometry tolerance profiles. If the weld bead is determined to be noncompliant, the system can generate an alert signal for the operator or take other corrective action.

Another aspect of the present invention is a method of centering a pipe section within the welding system described herein. More precisely, this involves repositioning the ring gear assembly such that its center point corresponds to the center point of the pipe section. Although centering the pipe section within the ring gear assembly is not critical for all embodiments, it is often advantageous to center the pipe section so that the weld joint will be equidistant from weld head assemblies along the entire circumference of the ring gear assembly. Typically, this method will begin with positioning the pipe section within the ring gear assembly (i.e., with the pipe section supported by rollers on each side of the ring gear assembly as suggested in FIG. 9). Next, at least one reading of the distance from the outer surface of the pipe section to the position sensor is obtained. Finally, the ring gear assembly is repositioned in order to move the center point of the ring gear assembly closer to the center point of pipe section.

In many embodiments, the position sensor used in determining the distance to the pipe section's outer surface is simply the position sensor 15 (FIG. 4B) mounted on the weld head assemblies as described above. However, in alternate embodiments, a separate position sensor separate from the weld head assemblies to could be used to measure the distance to the pipe for centering purposes. It is not necessary to move the center point of the pipe section to the exact center point of the ring gear, but it is preferred to have the pipe section center point within 1 cm of the ring gear assembly's center point. However, the method may still be practiced with greater margins of error between the pipe section center point and the ring gear assembly center point (e.g., an error of less than 5 cm, or less than 4 cm, or less than 3 cm, or less than 2 cm).

Normally, once the position sensor has determined the distance to outer surface of the pipe section, the system controller will use this information to move the ring gear assembly up/down or left/right (i.e., from the perspective seen in FIG. 2). Using the embodiment of FIG. 2 as an example, the ring gear assembly 10 may be moved left or right by mounting assemblies 75 traveling on horizontal guide rails 76 and up/down by traveling on vertical guide rails 81. While not explicitly showing in the drawings, motor and gear assemblies would be adapted to move the rail carriages 77 (FIG. 1) in a controlled manner along guide rails 76 and 81. These motor/gear assemblies would likewise be controlled by the system controller, thereby allowing the up/down, left/right position of ring gear assembly (and thus the center point of the ring gear assembly) to be precisely controlled.

There are numerous ways in which the required direction and magnitude of ring gear assembly movement may be calculated in order to match the ring gear center point with the pipe section center point. For example, if the pipe section diameter has been input into the welding system, then possibly a single reading of the distance between the position sensor and the outer surface of the pipe section will provide sufficient information to approximately align the two center points. However, more typically, at least two distance measurements along the circumference of the pipe joint allow a more accurate alignment of the center points. As an alternative to employing a known pipe diameter in the positioning calculation, the position sensor could take several distance measurements around the circumference of the ring gear. Thereafter, the controller would compute the magnitude and direction of mounting assemblies' 75 movement such that the out surface of the pipe section would be equal distant from the inner diameter of the ring gear at all circumferential points of measurement (thus aligning the center points of the pipe section and ring gear assembly). Those skilled in the art will recognize that there are many alternative methods to compute the magnitude and direction of the ring gear assembly movement in order to obtain center point alignment and all such methods should be considered within the scope of the present invention.

Figure 12:
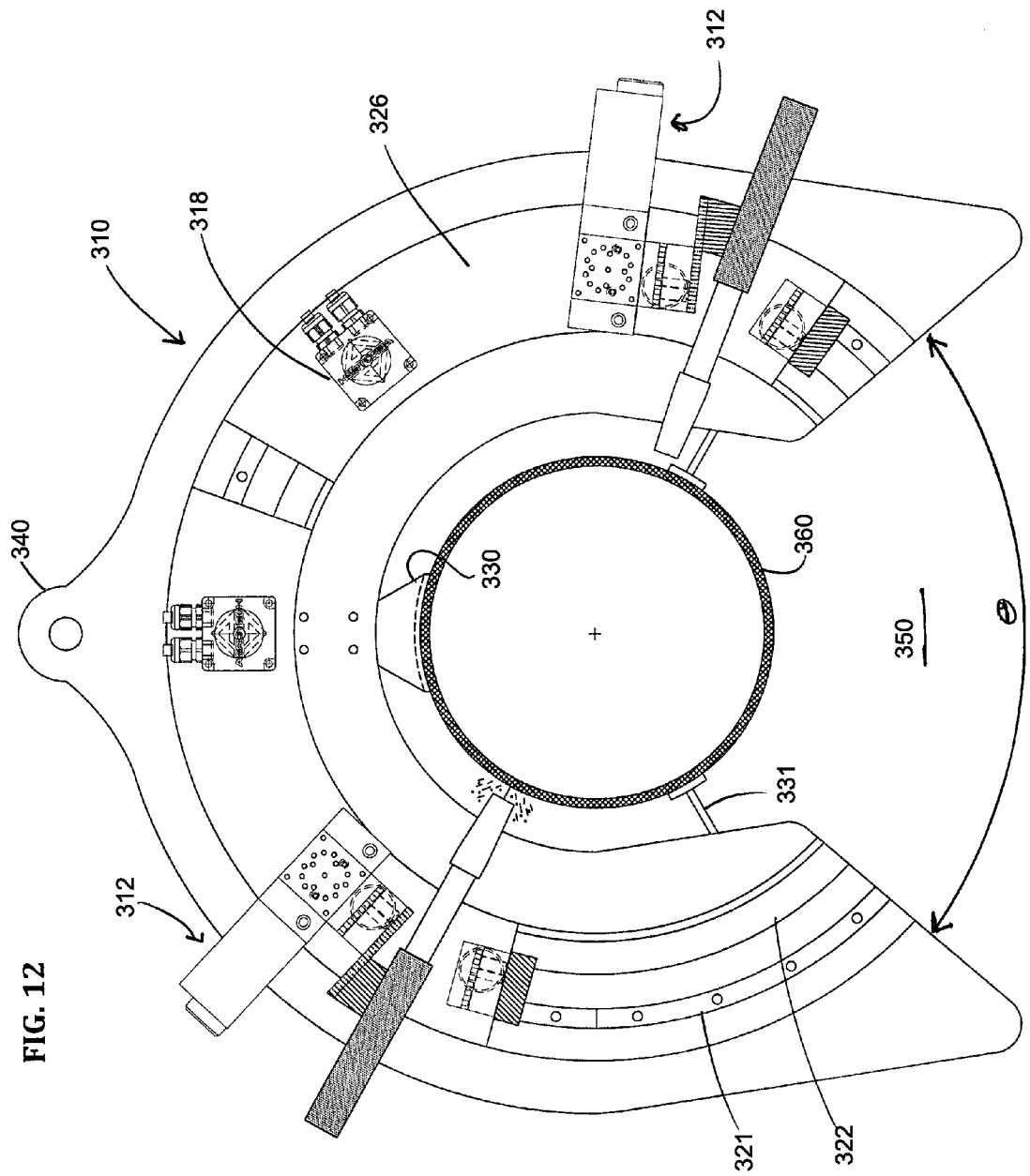
FIG. 12 illustrates a third embodiment of the ring gear assembly of the present invention.

FIG. 12 illustrates a still further embodiment of the present invention, ring gear assembly 310. This ring gear assembly includes an open throat 350 formed by a gap in the ring gear body where the gap has an arc length represented by theta in FIG. 12. In certain embodiments, theta is between about 60° and about 120° degrees and in one preferred embodiment, is about 80° degrees. Typically throat 350 will be somewhat wider than the largest diameter pipe expected to be welded by ring gear assembly 310, preferably with approximately one half inch clearance on each side of throat 350.

Ring gear assembly 310 has one or more weld head assemblies 312 which will include a welding torch, a torch positioner, and a position sensor such as described in the previous embodiments. However, mounting plate 326 differs somewhat from previous embodiments in that mounting plate 326 has a greater arcuate length and in the illustrated embodiment, will have sufficient length to position the welding torch across at least half of open throat 350 when weld head assembly 312 is in its lower most (i.e., closest to throat 350) position. It can be visualized that this allows the weld head assemblies 312 to extend into the open area of throat 350 and weld the underside of pipe section 360. Naturally, positioning motors 318 must be located at a distance sufficiently far from weld head assemblies 312 such that the weld head assemblies may extend into throat 350 while positioning motors 318 remain engaged with guide track 321 and ring gear 322. The embodiment of FIG. 12 shows two ring gear assemblies 310 where the mounting plates 326 have sufficient length to allow the weld head assemblies 312 to extend about half way across the throat gap.

Another feature of ring gear assembly 310 is the saddle brace 330 which forms a bracing and guide mechanism for the pipe section 360 onto which ring gear assembly 310 is positioned. FIG. 12 also shows two securing clamps 331 which, together with saddle brace 330, secure pipe section 360 within ring gear assembly 310. In the embodiment shown, securing clamps 331 are hydraulic (or pneumatic) ram and cylinder assemblies (only the rams are visible in FIG. 12 with the cylinder assemblies hidden behind the body of the ring gear assembly). However, the securing clamps are not limited ram and cylinder assemblies and could be any other linear actuator device (e.g., power screws) or some type of non-linear (e.g., pivoting) clamping mechanism. In the example of FIG. 12, saddle brace 330 has a face section for engaging pipe section 330 which is generally curved to correspond to the expected pipe curvature and has an arc length of between about 20° and about 60° and more preferably about 40° for engaging a pipe section.

In certain embodiments, the ring gear assembly 310 may be mounted on a traveling base carriage such as seen in FIGS. 1 and 7. However, in the embodiment of FIG. 12, ring gear assembly 310 includes a hanging bracket positioned generally opposite the open throat 350, thereby allowing ring gear assembly 310 to suspend by some type of overhead assembly (e.g., crane, overhead gantry system, etc.). In one example, hanging bracket 340 is a lifting eye having an ear section with an aperture formed through the ear sections. However, hanging bracket 340 could be any conventional or future developed structure allowing ring gear assembly to be suspended from a structure above the ring gear assembly.

A still further embodiment comprises a method of repositioning the pipe section in the ring gear assembly in order to allow components or objects attached to the pipe section to pass through the ring gear assembly. For example, T-shaped fittings, valves, and other valve assembly structures may be attached to one or more pipe sections and create an effective cross-sectional profile greater than the outer diameter of the pipe section itself. This method is particularly useful when the repositioning of the pipe section allows the components or objects to pass through the ring gear assembly without the need to separate the two half ring sections, or in the case where the ring gear assembly comprises a single continuous ring section.

Figure 13A:
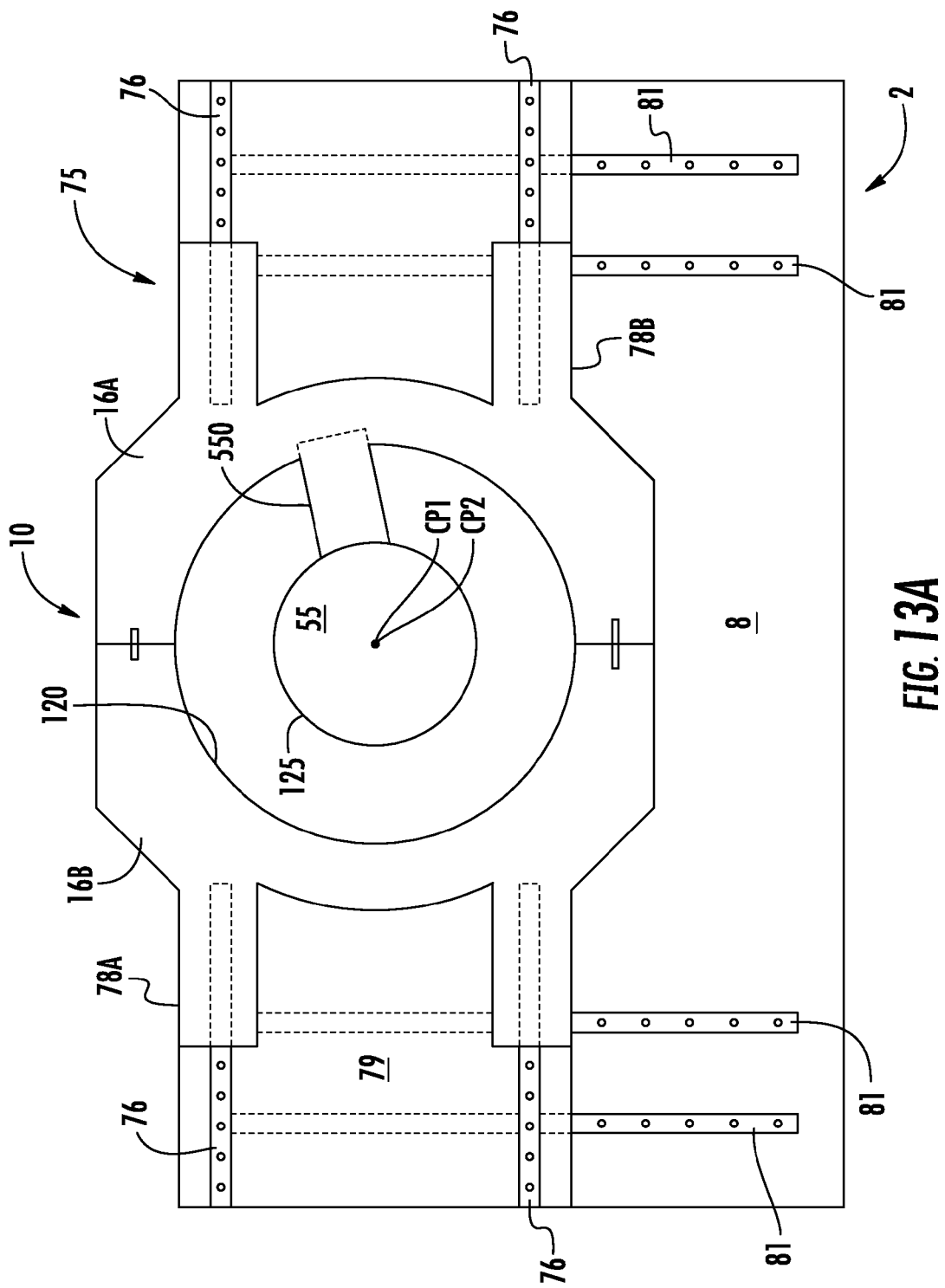
FIGS. 13A and 13B illustrate an alternate method embodiment of the present invention.

FIG. 13A illustrates a welding system with a ring gear assembly 10 mounted on a base 2. The base 2 may be a traveling base carriage described in reference to FIG. 1 or may be a stationary base of a different configuration. Ring gear assembly 10 is formed of half ring sections 16A and 16B and connected to base 2 with ring gear mounting assemblies 75 such as described in reference to earlier figures. Thus, mounting plates 79 travel on vertical guide rails 81 while upper extension arms 78A and lower extension arms 78B travel on horizontal guide rails 76. FIG. 13A also illustrates how the ring gear assembly will have a center point CP1 and the pipe section 55 will likewise have a center point CP2 (both center points occupying the same position in FIG. 13A). It can be seen that pipe section 55 has an object 550 attached thereto and with the pipe section 55 centered in ring gear assembly 10, the passage of object 550 through the center opening of the ring gear assembly will be potentially obstructed. It can also be seen that ring gear assembly 10 has an inner diameter 120 and pipe section 55 has an outer diameter 125. In many embodiments, inner diameter 120 will be at least about 8% greater than outer diameter 125. However, the relationship can vary in different embodiments and inner diameter 120 may range anywhere from at least about 5% to at least about 30% greater than outer diameter 125 (or any sub-range therebetween). Where a smaller pipe is used conjunction with a ring gear that is capable of accommodating much larger pipe, the difference in pipe OD to ring gear ID may much larger, even several hundred percent (e.g., from 30% to 300% or any sub-range therebetween). The greater dimension of the ring gear assembly's inner diameter to the pipe section's outer diameter creates a circular clearance area (i.e., the area of the ring gear opening less the cross-sectional area of the pipe section). As nonlimiting examples, typical pipe cross-sectional diameters may range from about 5 inches to about 60 inches whereas the inner diameter of the ring gear may range from about 8 inches to about 65 inches.

When an object 550 as seen in FIG. 13A is encountered, the ring gear mounting assemblies 75 may move horizontally on guide rails 76 and vertically on guide rails 81 to move the center point CP1 of ring gear assembly 10 to a different position. Of course, alternate embodiments could operate by allowing mounting assemblies 75 to move in only one direction, e.g., only vertically or only horizontally. Such vertical and horizontal planar movements are preferably substantially orthogonal to the pipe sections' longitudinal axis. As suggested by the example of FIG. 13B, center point CP1 has moved to the right of pipe section center point CP2 and object 550 may now pass through the opening in ring gear assembly 10. It is noted that in the example method illustrated in FIGS. 13A and 13B, ring gear assembly 10 remains in the closed position, i.e., in a closed circular section, for the entire operational time period when the pipe and object 550 is passing through ring gear assembly 10. In other words, in some embodiments, the ring gear assembly 10 is an enclosed circular structure. In one embodiment, the ring gear assembly 10 may comprise a unitary circular ring, while in another embodiment, the ring gear assembly 10 comprises two half ring sections. While it is advantageous from the operational viewpoint that two half-ring sections do not have to be separated, alternate method embodiments could perform the above method with some degree of separation between half-ring sections.

Figure 13B:
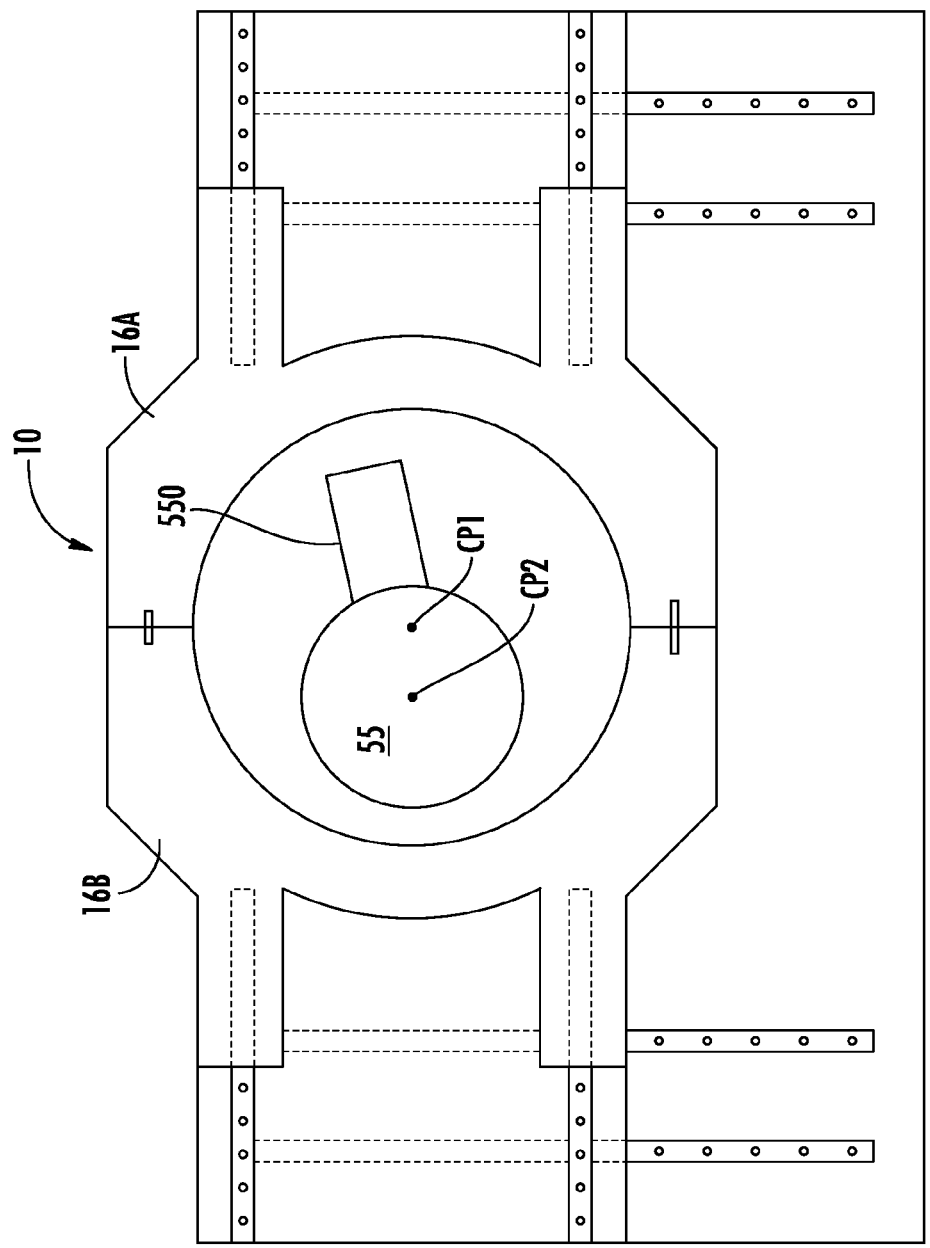

Referring to FIG. 13A, a longitudinal axis of the pipe section passes through center point CP2 of pipe 55 and is collinear with the center point CP1 of an aperture in ring gear assembly 10. After ring gear assembly 10 has been repositioned to allow object 550 to pass through the aperture in ring gear assembly 10, FIG. 13B shows that a longitudinal axis passing through the center point CP2 of pipe 55 is no longer collinear (i.e., nonlinear) with the ring gear assembly's 10 center point CP1.

In many embodiments, the positioning of ring gear assembly 10 along the horizontal and vertical guide rails may be directed by the system controller operating worm gears or other conventional activating mechanisms incorporated into ring gear mounting assemblies 75. Where the positioning of ring gear assembly 10 is automated, sensors on the welding system (e.g., torch position sensors 15) may be used to detect the maximum movement of ring gear assembly 10 prior to the ring gear assembly striking pipe section 55. Alternatively, where the ring gear inner diameter and pipe section outer diameter have been input into the system controller, the system controller can limit movement of the ring gear assembly to avoid such a collision. While there are advantages to automating the position control of the ring gear assembly, in other embodiments the center point of the ring gear assembly could simply be re-positioned manually as needed.

One alternate embodiment includes a method of welding a pipe joint comprising the steps of: (a) positioning at least two sections of pipe extending through a weld system ring gear assembly mounted on a base carriage, the sections of pipe being mounted independently of the base carriage; (b) positioning the base carriage to detect a pipe joint along a line of the pipe sections; (c) setting a velocity of the base carriage to approximately the velocity of the pipe joint's lateral movement in order to maintain the position of the weld-head approximately at the pipe joint; (d) scanning the pipe joint with a position sensor mounted on the ring gear assembly; (e) welding of the pipe joint with a welding torch mounted on the ring gear assembly; and (f) re-scanning a weld for defects with the position sensor as the weld head assembly returns to a start position.

Another embodiment is a welding system comprising: (a) a traveling base carriage; (b) carriage positioning mechanism engaging the base carriage; (c) a ring gear assembly mounted on the base carriage; and (d) a weld head assembly mounted on the ring gear assembly. The weld head assembly includes (i) a welding torch; (ii) a torch positioner; and (iii) a position sensor. A line of pipe sections extend through the ring gear and are positioned independent of the traveling carriage. A joint sensor is spaced apart from the weld-heads and a system controller is programmed to control the carriage and the weld-head to perform the steps of: (i) detecting a pipe joint along a line of pipe sections; (ii) setting a velocity of the base carriage to approximate the pipe joint's lateral movement in order to maintain the position of the weld head assembly approximately at the pipe joint; (iii) simultaneously scanning of the pipe joint with the position sensor and welding of the pipe joint with the welding torch; and (iv) adjusting a path of the welding torch to accommodate a geometry of the pipe joint as detected by the position sensor. This embodiment could further perform the step of re-scanning a completed weld for defects with the position sensor as the weld-head returns to a start position.

In the above embodiment, the weld head assembly may comprise a first torch positioner moving the welding torch in a radial direction and a second torch positioner moving the welding torch in a lateral direction. Additionally, a third positioner may engage a gear on the ring gear assembly and move the weld head assembly in an angular direction. The positioning sensor may comprise a camera having a filter for filtering light wavelengths produced by welding with the welding torch. In a modification of this embodiment, the base carriage moves independently of the pipe sections.

A still further embodiment is a welding system comprising a ring gear assembly having an open throat and at least one weld-head assembly mounted on the ring gear assembly. The weld-head assembly including a mounting plate comprising: i) a welding torch, ii) a torch positioner, and iii) a position sensor. The mounting plate has sufficient length to position the welding torch across at least about one half of the open throat. A system controller is programmed to control the weld-head assembly to adjust a path of the welding torch to accommodate a geometry of the pipe joint as detected by the position sensor. In this embodiment, the open throat comprises an arcuate gap of between about 60 and about 120 degrees. Alternatively, the ring gear assembly further comprises a saddle brace and at least one movable positioning arm opposing the saddle brace. In one embodiment, there are at least two movable positioning arms wherein the movable positioning arms comprise piston and cylinder assemblies. Additionally, the saddle brace may have an arcuate surface between about 20 and about 60 degrees for engaging a pipe section. This ring gear assembly may also have a hanging bracket positioned generally opposite the open throat.

Although the present invention has been described in terms of specific embodiments, those skilled in the art will see many obvious variations and modifications. For example, the illustrated embodiments show the welding system mounted on generally horizontal surfaces (e.g., the deck of a pipe laying barge). However, a variation of the traveling base carriage could also be mounted "sideways" on a vertical surface. All such variations and modifications are intended to come within the scope of the following claims.

What is claimed is:

1. A method of welding a pipe section in a ring-based welding system, wherein the welding system comprises: (i) an adjustable ring gear mount; (ii) a ring gear assembly positioned on the adjustable ring gear mount, the ring gear assembly having an inner diameter and a center point; and (iii) at least one weld head assembly mounted on the ring gear assembly; wherein the method comprises the steps of:
   (a) positioning the pipe section within the ring gear assembly, the pipe section having (i) an outer diameter less than the inner diameter of the ring gear assembly, (ii) a pipe center point, (iii) a longitudinal axis, and (iv) an object attached to the pipe section which enlarges a cross-sectional profile of the pipe section;
   (b) moving the pipe section through the ring gear assembly in a direction substantially parallel to the pipe section's longitudinal axis;
   (c) operating the adjustable ring gear mount to move the center point of the ring gear assembly relative to the pipe center point in a plane substantially orthogonal to the pipe section's longitudinal axis; and
   (d) moving the attached object through the ring gear assembly while the ring gear assembly remains an enclosed circular structure.

2. The method according to claim 1, wherein the ring gear assembly comprises two half ring sections with a locking mechanism maintaining the half ring sections together.

3. The method according to claim 1, wherein the ring gear assembly comprises a unitary circular ring.

4. The method according to claim 1, wherein the ring gear mount allows two dimensional movement in a plane substantially orthogonal to the longitudinal axis of the pipe section.

5. The method according to claim 2, wherein the ring gear mount comprises guide rail and rail carriage assemblies allowing movement of the half ring sections on a base, wherein the adjustable ring gear mount is positioned on the base.

6. A method of welding a pipe section in a ring-based welding system, wherein the welding system comprises: (i) an adjustable ring gear mount; (ii) a ring gear assembly positioned on the adjustable ring gear mount, the ring gear assembly having an inner diameter and a center point; and (iii) at least one weld head assembly mounted on the ring gear assembly; wherein the method comprises the steps of:
 positioning the pipe section within the ring gear assembly, the pipe section having (i) an outer diameter less than the inner diameter of the ring gear assembly, (ii) a pipe center point, (iii) a longitudinal axis, and (iv) an object attached to the pipe section which enlarges a cross-sectional profile of the pipe section;
 moving the pipe section through the ring gear assembly in a direction substantially parallel to the pipe section's longitudinal axis;
 operating the adjustable ring gear mount to move the center point of the ring gear assembly relative to the pipe center point in a plane substantially orthogonal to the pipe section's longitudinal axis; and
 moving the attached object through the ring gear assembly while the ring gear assembly remains an enclosed circular structure;
  wherein the ring gear assembly comprises two half ring sections with a locking mechanism maintaining the half ring sections together;
  wherein the ring gear mount comprises guide rail and rail carriage assemblies allowing movement of the half ring sections on a base, wherein the adjustable ring gear mount is positioned on the base;
  wherein the ring gear mount comprises a first guide rail positioned between the base and a mounting plate, and a second guide rail positioned on the mounting plate, wherein the second guide rail is substantially perpendicular to the first guide rail.

7. The method according to claim 6, wherein the second guide rail is positioned horizontally such that extension arms of the half ring sections may travel along the second guide rail.

8. The method according to claim 5, wherein the half ring sections each include upper and lower extension arms to which the guide rails are attached.

9. The method according to claim 1, wherein the inner diameter of the ring gear assembly is at least eight percent greater than the outer diameter of the pipe section.

10. The method according to claim 1, wherein the welding system further comprises a system controller and the outer diameter of the pipe section has been entered into the welding system and the controller employs the outer diameter to calculate a maximum allowable movement of the ring gear assembly.

11. The method according to claim 2, wherein the pipe section and the attached object are passed entirely through the ring gear assembly without the half ring sections being separated from one another.

12. The method according to claim 2, wherein the ring gear mount is positioned on a base, the base comprising guide rail and rail carriage assemblies allowing the ring gear mount to move relative to the pipe section in a direction substantially parallel to the pipe section's longitudinal axis.

13. The method according to claim 1, wherein the ring gear mount comprises guide rail and rail carriage assemblies allowing the enclosed circular structure to move relative to the pipe section in a direction substantially parallel to the pipe section's longitudinal axis.

14. The method according to claim 1, wherein the ring gear assembly comprises a plurality of ring sections and a releasable fastener fastening at least two contiguous ring sections together.

15. A welding system comprising:
 an adjustable ring gear mount;
 a ring gear assembly positioned on the adjustable ring gear mount, the ring gear assembly comprising a substantially planar circular structure and having an inner diameter and a center point;
 at least one weld head assembly mounted on the ring gear assembly; and
 wherein the ring gear assembly is in an enclosed position and when a pipe section is positioned within the ring gear assembly, the center point of the ring gear assembly is moveable a distance in at least one dimension within a plane of the ring gear assembly relative to a center point of the pipe section.

16. The welding system of claim 15, further comprising:
 the pipe section positioned within the ring gear assembly, the pipe section having (i) an outer diameter less than the inner diameter of the ring gear assembly and an object attached to the pipe section which enlarges a cross-sectional profile of the pipe section; and
 wherein the plane of the ring gear assembly is substantially orthogonal to the pipe section's longitudinal axis.

17. The welding system of claim 16, wherein the adjustable ring gear mount is positioned on a base, the base comprising guide rail and rail carriage assemblies allowing the ring gear mount to move relative to the pipe section in a direction substantially parallel to the pipe section's longitudinal axis.

18. The method according to claim 1, wherein, at least during step (d), the pipe section's longitudinal axis extends through the pipe center point and does not intersect the ring gear assembly's center point.

19. The welding system of claim 16, wherein the pipe section's longitudinal axis extends through the pipe center point and does not intersect with the ring gear assembly's center point.

20. A method of welding a pipe in a ring-based welding system, wherein the welding system comprises: (i) a base, (ii) an adjustable ring gear mount positioned on the base to allow at least two dimension movement; (iii) a ring gear assembly positioned on the adjustable ring gear mount, the ring gear assembly having an inner diameter and a center point; and (iv) at least one weld head assembly mounted on the ring gear assembly, the weld head assembly including a welding torch; wherein the method comprises the steps of:
 positioning a pipe section within the ring gear assembly, the pipe section having (i) an outer diameter less than the inner diameter of the ring gear assembly, (ii) a pipe center point, and (iii) an object attached to the pipe section which enlarges the cross-sectional profile of the pipe section;
 moving the pipe section through the ring gear assembly in a lateral direction; and
 operating the adjustable ring gear mount to move the center point of the ring gear assembly relative to the center point of the pipe section in order to allow passage of the attached object through the ring gear assembly while the ring gear assembly is in an enclosed position.

21. The welding system of claim 15, wherein the pipe section is positioned within the ring gear assembly.

22. The welding system of claim 15, wherein the adjustable ring gear mount is positioned on a base and wherein the ring gear mount comprises a first guide rail positioned between the base and a mounting plate, and a second guide rail positioned on the mounting plate.

23. The welding system of claim 15, wherein the distance is sufficient to allow an attached object to pass through the ring gear assembly in the enclosed position.

\* \* \* \* \*